(12) United States Patent
Aras et al.

(10) Patent No.: US 10,404,056 B2
(45) Date of Patent: Sep. 3, 2019

(54) SAFE OPERATING AREA ENERGY LIMIT SYSTEM AND METHOD IN POWER APPLICATION

(71) Applicant: TEXAS INSTRUMENTS INCORPORATED, Dallas, TX (US)

(72) Inventors: Sualp Aras, Dallas, TX (US); Adam Quirk, Dallas, TX (US); Md. Abidur Rahman, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 293 days.

(21) Appl. No.: 15/225,462

(22) Filed: Aug. 1, 2016

(65) Prior Publication Data

US 2017/0033552 A1 Feb. 2, 2017

Related U.S. Application Data

(60) Provisional application No. 62/199,711, filed on Jul. 31, 2015.

(51) Int. Cl.
*H02H 3/00* (2006.01)
*H02H 3/38* (2006.01)

(52) U.S. Cl.
CPC .............. *H02H 3/38* (2013.01); *H02H 3/006* (2013.01)

(58) Field of Classification Search
None
See application file for complete search history.

(56) References Cited

U.S. PATENT DOCUMENTS

| | | | | |
|---|---|---|---|---|
| 6,169,439 | B1 * | 1/2001 | Teggatz | H03K 17/0822 327/309 |
| 6,870,351 | B2 * | 3/2005 | Sugimura | G05F 1/573 323/277 |
| 9,172,243 | B2 * | 10/2015 | Kunz, Jr. | H02H 9/046 |
| 9,184,666 | B2 * | 11/2015 | Sood | H02M 3/33523 |
| 2018/0069394 | A1 * | 3/2018 | Hagen | H02H 9/00 |

* cited by examiner

*Primary Examiner* — Stephen W Jackson
(74) *Attorney, Agent, or Firm* — Lawrence J. Bassuk; Charles A. Brill; Frank D. Cimino

(57) ABSTRACT

A circuit protective system with an input for sensing a reference current and an input for sensing a reference voltage. The system also has circuitry for determining an estimated energy in response to the reference current and the reference voltage and circuitry for generating a control signal responsive to the estimated energy exceeding a threshold.

17 Claims, 5 Drawing Sheets

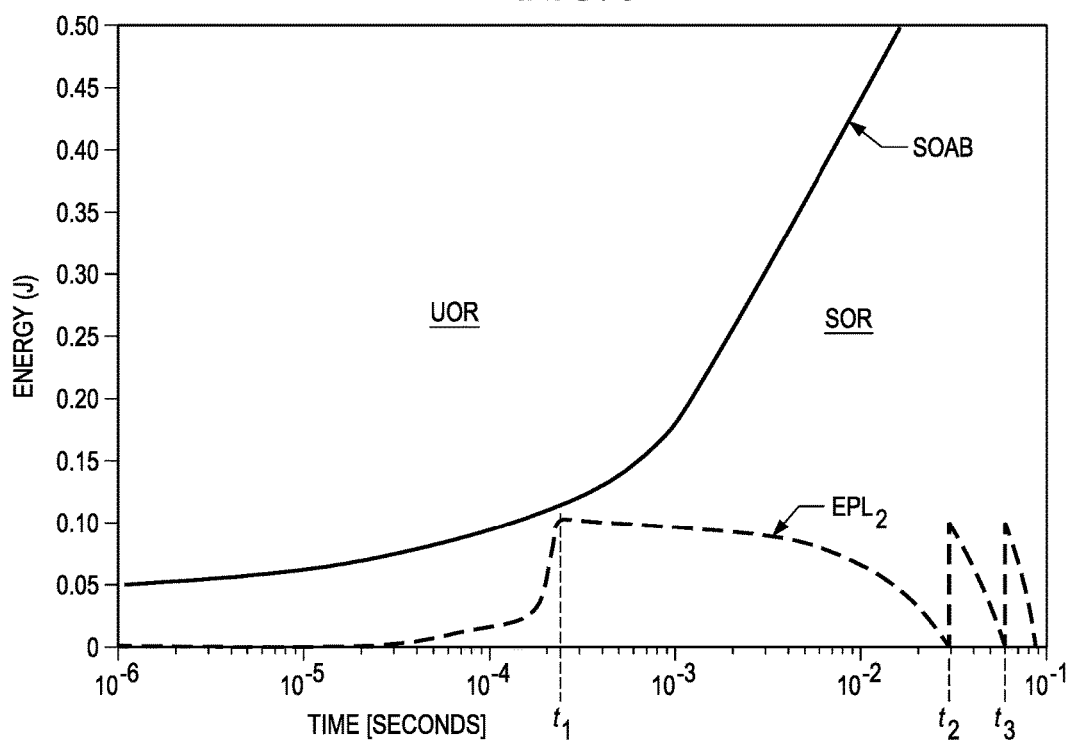

US 10,404,056 B2

SAFE OPERATING AREA ENERGY LIMIT SYSTEM AND METHOD IN POWER APPLICATION

CROSS-REFERENCES TO RELATED APPLICATIONS

This application claims priority to, the benefit of the filing date of, and hereby incorporates herein by reference, U.S. Provisional Patent Application 62/199,711, entitled "Energy Limit Technique to Operate Power FETs within SOA Boundary," and filed Jul. 31, 2015.

STATEMENT REGARDING FEDERALLY SPONSORED RESEARCH OR DEVELOPMENT

Not Applicable.

BACKGROUND OF THE INVENTION

The preferred embodiments relate to electronic power driven systems, such as those driven with power field effect transistors (FETs).

The factors involved in certain FET power applications may conflict with one another, in terms of sufficiently sourcing power while protecting component longevity. For example, some electronically-driven power devices have high transient demands, such as at cold start-up, which tend toward requiring high current flow to meet the device (or customer) demands. However, high current flow can cause stress, damage, and fault violations to power driving circuitry, including one or more FETs. Certain prior art approaches have evolved in an effort to balance between these competing factors, but such approaches are not particularly ideal in some applications. For example, in automotive body module applications, such as energizing an incandescent bulb coil at cold temperatures, very high peak in-rush current may be required to initially drive the coil, such as current demands in the range of approximately 90 A to 100 A. Typically, a high-side power FET is used as switch to allow this much current to flow, and in order to meet the high demands, any limit on current flow must be higher than the expected demand. Hence, a level of protective circuitry may be included that disables current flow in response to instantaneous current or power exceeding a set threshold, but the application dictates a high current threshold. Such a threshold, therefore can lead to very high voltage across the FET in instances other than the in-rush event. For example, if a true short-circuit develops in the load, then large amounts of current may flow within the limit of the protective circuitry, while that current is sourced immediately to ground via the short. As another example, where the load is inductive, as can be the case for a long cable short, then there may be a sudden negative voltage spike that causes a high drain-to-source voltage across the FET that is driving the inductive load, when that FET is disabled which is a condition known as fly-back, or the FET otherwise can accumulate excessive energy that can cause stress or damage to the FET. Thus, by implementing a higher limit, then stress/damage or other violations of the safe operating area (SOA) boundary violations of the FET may occur during switch turn-on, switch turn-off, and other events.

The above-described automotive application may suffer an additional drawback if addressed with the prior art instantaneous current or power protective circuit. Specifically, the instantaneous nature of such a circuit causes a shutdown of current flow when the monitored threshold is exceeded, followed typically by a delay and retry, that is, where power is restored following the threshold-detection. However, if the current demands of the circuit rise quickly yet for a short time, the protective circuit may immediately respond by disabling current flow, then retry only to repeat the disablement, with the process causing repeated failures in sourcing current that is otherwise needed for normal operation of the application.

Given the preceding, while the prior art approaches may be acceptable in certain implementations, some applications may have requirements that are not satisfactorily met with these prior art approaches. Alternatively, such approaches may be deemed unacceptable to an electronics customer seeking to implement an application. Thus, the present inventors seek to improve upon the prior art, as further detailed below.

BRIEF SUMMARY OF THE INVENTION

In a preferred embodiment, there is a circuit protective system. The system comprises an input for sensing a reference current and an input for sensing a reference voltage. The system also comprises circuitry for determining an estimated energy in response to the reference current and the reference voltage. The system also comprises circuitry for generating a control signal responsive to the estimated energy exceeding a threshold.

Numerous other inventive aspects are also disclosed and claimed.

BRIEF DESCRIPTION OF THE SEVERAL VIEWS OF THE DRAWING

FIG. 9 repeats the illustration of FIG. 3, but adds an energy plot line $EPL_2$ to demonstrate a second example of the SOA location of an energy profile of load current $I_L$ through a load.

DETAILED DESCRIPTION OF EMBODIMENTS

Figure 1:
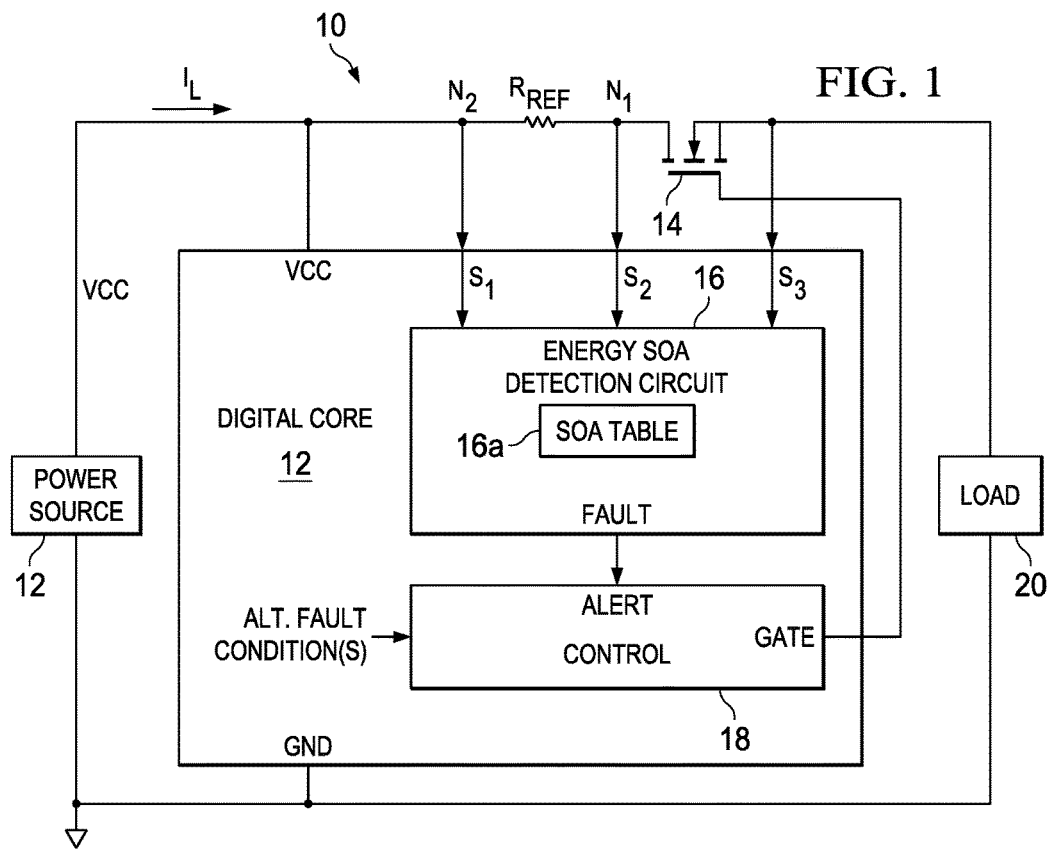
FIG. 1 illustrates a preferred embodiment system 10 for controlling the supply of power based on energy determinations.

FIG. 1 illustrates a system 10 that controls the supply of power based on energy determinations, as is introduced in electrical block form in FIG. 1 and further detailed throughout this document. System 10 includes a digital core 12, which may be constructed of various devices so as to achieve the functionality described below. For example, digital core 12 may be implemented as part of a processor (including appropriate programming) or as an integrated circuit module, akin in some respects to commercially available power controllers that are used in connection with thermal or power detection of an associated power transistor. One contemporary example for such a power controller is the TPS2482 sold by Texas Instruments Incorporated, so the functionality of that device may be further augmented by including additional circuitry and control to accomplish the operational aspects described herein.

Looking to device connectivity in FIG. 1, digital core 12 is powered between a DC reference voltage VCC, which is sometimes referred to by other conventions, such as VBB if battery power provides the voltage, and ground. Digital core 12 is connected as detailed below to a power transistor 14, such as an n-channel MOSFET, for sensing energy through that device and selectively enabling its gate to turn on or off the transistor. Digital core 12 includes an energy safe operating area (SOA) detection circuit 16 that evaluates energy across transistor 14 and in response communicates a FAULT signal to an ALERT input of a control block 18. In response, control block 18 controls a GATE enable output, connected to a gate of power transistor 14, so that digital core 12 can selectively apply a gate bias to enable or disable the current path through transistor 14, and as detailed later, so as to reduce the stress and potential damage to the power transistor based on conditions detected by energy SOA detection circuit 16. Additionally, control block 18 has an input(s) to receive an alternative fault condition(s), which could be based on instantaneous current, whereby such a current detection circuit can be connected to sense the potential at a sensing input $S_1$ for sensing the potential at a node $N_1$ and to sense the potential at a sensing input $S_2$ for sensing the potential at a node $N_2$, whereby the current $I_L$ between those nodes is thereby ascertainable by the detection circuit, such as by dividing the potential between those nodes (i.e., across resistor $R_{REF}$ as sensed between inputs $S_1$ and $S_2$) by the known resistance of that resistor. In this manner, therefore, the instantaneous current detection circuit can alert block 18, via the alternative fault conditions input, if the sensed current has exceeded a given limit. Note that other alternative fault conditions also may be monitored, and block 18 alerted, if a respective condition exceeds a threshold, including power and/or thermal monitoring. In all events, therefore, when block 18 is so alerted, it also may selectively assert its GATE control to turn on/off transistor 14 in response to these conditions as well. Transistor 14 is connected to drive a load 20, where, for example, load 20 may include an inductive element. For example, and as introduced earlier in the Background of the Invention section, load 20 may include a long cable, which may have inductive properties. A preferred embodiment is particularly well-suited for such a load and for the power FET driving it. In the example illustrated in FIG. 1, load 20 is connected between ground and the source and body of transistor 14. The drain of transistor 14 is connected to a first node $N_1$ of a reference resistor $R_{REF}$, and a second node $N_2$ of resistor $R_{REF}$ is also connected to VCC. Energy SOA detection circuit 16 has three sensing inputs, a first $S_1$ for sensing the potential at second node $N_2$ of resistor $R_{REF}$, a second $S_2$ for sensing the potential at first node $N_1$ of resistor $R_{REF}$ (and hence also the drain of transistor 14), and a third $S_3$ for sensing the source voltage of transistor 14.

The operation of system 10 is now introduced, and is further detailed in the remainder of this document. In general, when transistor 14 is enabled, it sources current $I_L$ to load 20, so in the case where the load is an incandescent bulb, then in proper operation current $I_L$ will satisfy the load start-up requirements, such as a relatively large in-rush current needed for a cold start. Further, $I_L$ will thereafter satisfy the generally-static requirements of current for the bulb once its filament is heated. Further in this regard, however, energy SOA detection circuit 16 senses, via its sensing inputs $S_1$ and $S_2$, the current $I_L$ through transistor 14 when that transistor is enabled, and circuit 16 also senses, via its sensing inputs $S_2$ and $S_3$, the voltage across transistor 14 when that transistor is enabled. The product of these two sensed parameters (or a scaled version thereof) represents power, and further in a preferred embodiment, circuit 16 evaluates the trend of this power over time, that is, the transistor energy. Also in a preferred embodiment, energy limits are established and circuit 16 compares monitored energy to such limits, whereby circuit 16 is operable to detect a condition representing an amount of energy across transistor 14 that may provide unsafe operation, that is, exceeding a safe operating area for the device. In response to detecting an unsafe energy condition, circuit 16 asserts a FAULT signal that is coupled as an ALERT input to control block 18. In response, control block 18 will disable the GATE output, thereby disabling transistor 14 for a period of time, preferably until the FAULT signal is no longer asserted by circuit 16. These operations, therefore, seek to keep the stress and potential damage to transistor 14 within safe boundaries, while still permitting satisfactory operation of load 20. One skilled in the art will appreciate these and numerous other aspects, from various additional teachings detailed below.

According to a preferred embodiment, energy SOA detection circuit 16 stores an SOA table 16a that includes data representative of safe operating area limits for energy to be imparted across transistor 14. Such data may be stored in various forms (e.g., electronic storage, such as internal permanent or programmable memory), and note therefore that the term "table" is used simply as a reference to a collection of information against which comparisons are made as further detailed herein. By way of introduction in this regard, circuit 16 monitors time windows, and an accumulation, of energy measures and compares these values to those in table 16a, so as to determine if the SOA is breached, in which case a FAULT may be asserted by circuit 16 to control block 18. Note that in a preferred embodiment, the values in table 16a may be established given various information about the SOA for transistor 14, as further discussed below.

Figure 2:
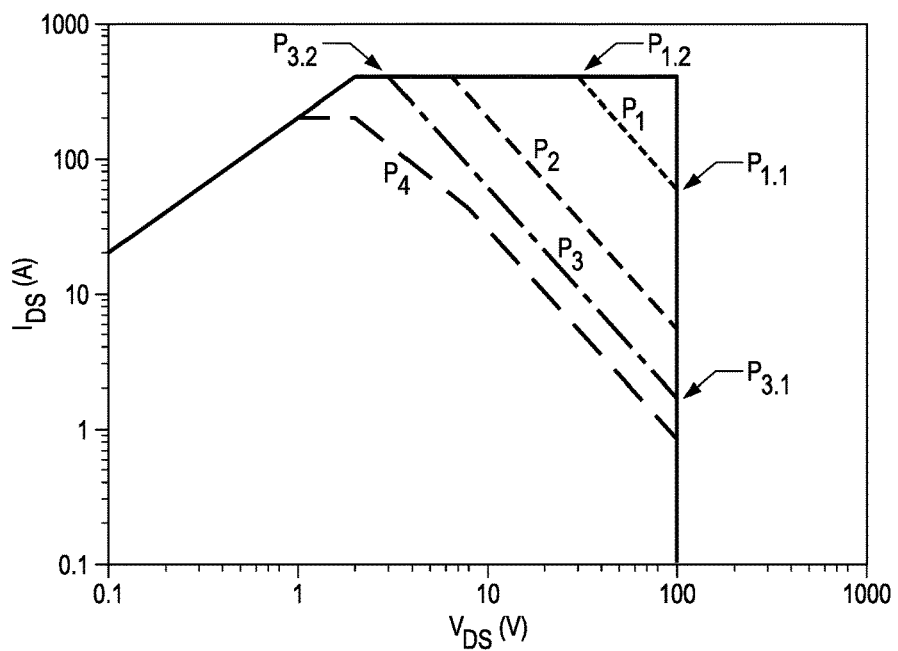
FIG. 2 illustrates a typical prior art plot of current and voltage limits for a transistor.

To further illustrate the nature of the data in table 16a, FIG. 2 illustrates a typical prior art plot of current and voltage limits for a transistor, as is often provided in literature (e.g., a datasheet) that is available for users of the device. Particularly, FIG. 2 illustrates transistor drain-to-source voltage ($V_{DS}$) across its horizontal axis, and transistor drain-to-source current ($I_{DS}$) across its vertical axis, both in logarithmic scales. Four different plots $P_1$, $P_2$, $P_3$, and $P_4$, are also shown, where each plot $P_x$ corresponds to a different amount of time at which the current/voltage values are imposed on the transistor. For example, plot $P_1$ illustrates the transistor operation for a period of 100 μs, where, for example, the plot at a point $P_{1.1}$ depicts a limit of operation for a $V_{DS}$ of 100V and an $I_{DS}$ of 60 A, and the plot $P_1$ at a point $P_{1.2}$ depicts a limit of operation for a $V_{DS}$ of 30V and an $I_{DS}$ of 400 A. Similarly, plot $P_3$ illustrates the transistor operation for a period of 10 ms, where, for example, the plot at a point $P_{3.1}$ depicts a limit of operation for a $V_{DS}$ of approximately 100V and an $I_{DS}$ of approximately 1.8 A, and the plot $P_3$ at a point $P_{3.2}$ depicts a limit of operation for a $V_{DS}$ of 30V and an $I_{DS}$ of 400 A. As would be appreciated by one skilled in the art, therefore, for shorter periods of time of operation, the transistor may sustain relatively larger amounts of $V_{DS}$ and/or $I_{DS}$, as compare to longer periods of operation. Indeed, the limits depicted by FIG. 2 are representative of the types of measures utilized by certain existing power controllers in which case a transistor is selectively enabled and disabled, solely based on the I/V (i.e., power) limits depicted in the plots. As detailed below, however, a preferred embodiment further contemplates measures of energy, that is, power over time, rather than limiting operation based on instantaneous power.

Figure 3:
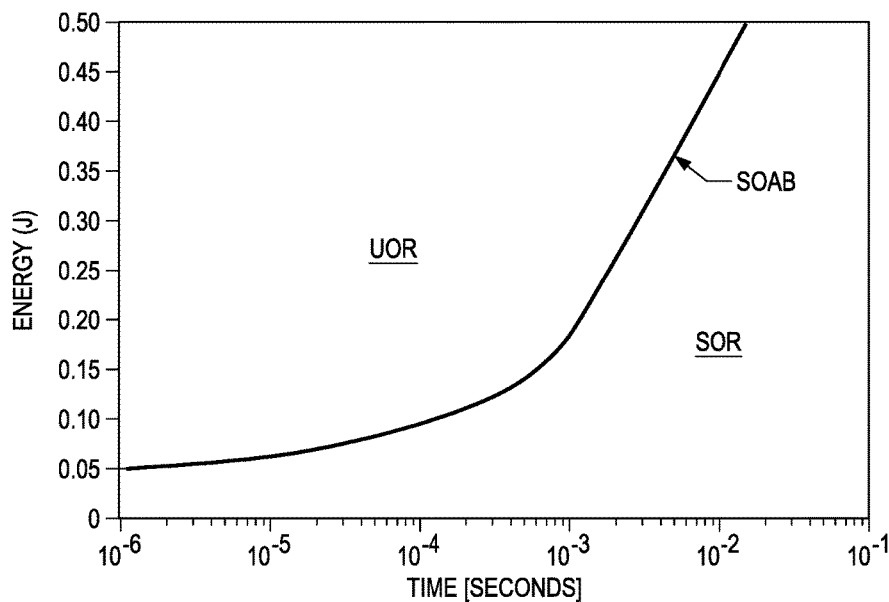
FIG. 3 illustrates a preferred embodiment safe operating area (SOA) energy profile plot, derived, for example, from a set of I/V curves for a transistor.

Given the preceding, FIG. 3 illustrates a preferred embodiment SOA energy profile plot, derived, for example, from a set of I/V curves for a transistor, as shown in one instance in FIG. 2. More particularly, FIG. 3 illustrates time across its horizontal axis on a logarithmic scale, and transistor energy across its vertical axis. An SOA boundary SOAB is also shown in FIG. 3, whereby an unsafe operating region UOR appears above boundary SOAB, and a safe operating region SOR appears below boundary SOAB. In a preferred embodiment, the SOAB energy plot is derived by integration of pulse power SOA data that is typically provided by an FET manufacturer, as shown by the diagonal power lines $P_1$ to $P_4$ in FIG. 2. For example, $P_1$ is higher power than $P_4$, but it has to have shorter duration for the device to be within SOA. This data provides the maximum power for increasing pulse durations, so that from each pulse duration, maximum energy can be calculated. Accordingly, the FIG. 3 SOAB is the composite of maximum energies for these pulse durations. In any event, in general, therefore, system 10 operates so that detection circuit 16 monitors the energy across transistor 14 and provides control, via the FAULT signal, so that transistor 14 is enabled only to operate in safe operating region SOR. If such energy falls within the unsafe operating region UOR, then FAULT is asserted and received by control block 18 as an ALERT, and control block 18 responds by disabling transistor 14 via its GATE output, with the possibility of retrying or re-enabling transistor 14 at a time when FAULT is no longer asserted by detection circuit 16. Various preferred embodiment aspects for providing such detection and control are provided below.

Figure 4:
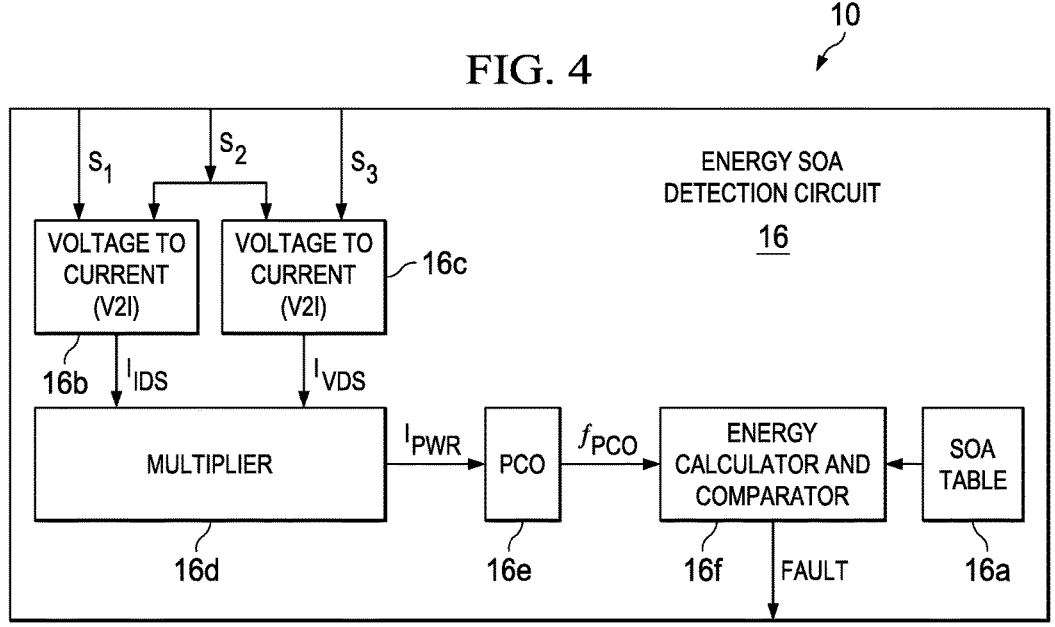
FIG. 4 illustrates an electrical block diagram of energy SOA detection circuit 16 of FIG. 1, in greater detail.

FIG. 4 illustrates an electrical block diagram of energy SOA detection circuit 16 of FIG. 1, in greater detail. Each of the blocks in FIG. 4 is described below, where one skilled in the art may ascertain various manners of implementing some of those blocks (e.g., in circuitry, software, firmware, or a combination thereof), while additional detail with respect to certain of such implementation is provided later. Looking at the general connectivity and functionality in FIG. 4, sensing inputs S1 and S2 are connected to a first voltage to current (V2I) converter 16b. Because sensing inputs S1 and S2 provide voltages representative of the drain-to-source current through transistor 14, then V2I converter 16b thereby provides a current output that is designated as IIDS, representative of that voltage. Similarly, sensing inputs S2 and S3 are connected to a second voltage to current (V2I) converter 16c. Because sensing inputs S2 and S3 provide voltages representative of the drain-to-source voltage of transistor 14, then V2I converter 16c thereby provides a current output that is designated as IVDS, representative of that voltage. Note that voltage-to-current converters are well-known and thus one skilled in the art may select from various conventional architectures so as to implement such circuits and their respective functionality. Each respective output of converters 16b and 16c is connected to a multiplier 16d, which multiplies those two inputs; since one input represents transistor current and the other represents transistor voltage, the product is representative of power, as indicated in the output, IPWR, from multiplier 16d. Current multipliers are also well-known and once again, therefore, one skilled in the art may select from various conventional architectures so as to implement the multiplier circuit and functionality, such as in a bi-CMOS transistor design. The output, IPWR, from multiplier 16d, is connected as an input to what is referred to herein as a power controlled oscillator (PCO) 16e, which as this descriptor suggests, provides an output oscillating signal, fPCO, that has a frequency proportional to the level of power represented in the input of IPWR, that is, the larger IPWR, the faster the output oscillating signal, fPCO. The output oscillating signal, fPCO is connected to an energy calculator and comparator 16f, which also receives as an input the data from SOA table 16a, which was introduced earlier in connection with FIG. 3. The calculating portion of block 16f calculates an energy determination based on power over time, where the power indication is from fPCO. The comparator portion of block 16f compares the calculated energy to data in SOA table 16a, so as to determine at different time periods whether energy across transistor 14 exceeds the FIG. 3 boundary SOAB. Thus, block 16f ultimately asserts the FAULT signal if energy calculated falls within the unsafe operating region UOR of FIG. 3, or it de-asserts that FAULT signal if such energy is within the safe operating region SOR of FIG. 3. Control block 18, therefore, may respond as described earlier, in response to the FAULT signal, as is also illustrated later by way of depicting an anticipated favorable operation and result achieved by a preferred embodiment.

Figure 5:
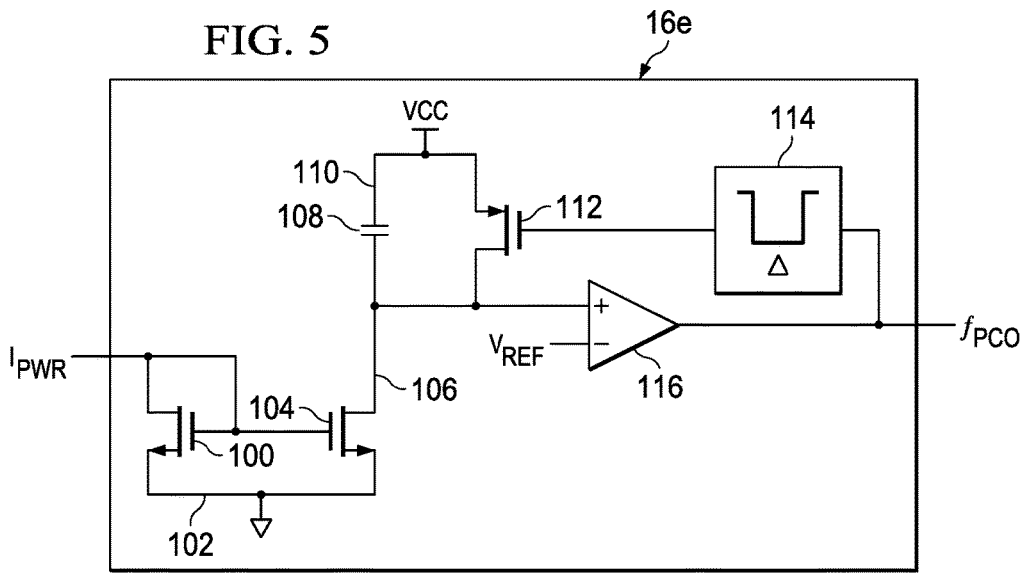
FIG. 5 illustrates a schematic of a preferred embodiment for implementing PCO 16e, as introduced in FIG. 4.

FIG. 5 illustrates a schematic of a preferred embodiment for implementing PCO 16e, introduced above in FIG. 4. The $I_{PWR}$ input is connected as a current source to the drain of a first n-channel field effect transistor (FET) 100, which has its source connected a node 102 and its gate connected both to its source and also to a gate of a second n-channel FET 104. The source of second FET 104 is connected to node 102, which is connected to a second reference potential, such as ground, and the drain of second FET 104 is connected to a node 106. A capacitor 108 is connected between node 108 and a node 110, where node 110 is further connected to the DC reference voltage VCC. Node 110 is also connected to the source of a p-channel FET 112, which has its drain connected to node 106 and its gate connected to an output of a delay circuit 114. The input of delay circuit 114 is connected to the output of a comparator 116. A non-inverting input of comparator 116 is connected to node 106, and an inverting input of comparator 116 is connected to a reference voltage $V_{REF}$. The output of comparator 116 is, as mentioned before, connected to the input of delay circuit 114, and it also provides the signal output of PCO 16e, that is, the frequency $f_{PCO}$, which as further demonstrated below is a frequency controlled waveform controlled by the level of the input $I_{PWR}$.

The operation of PCO 16e is now described. Initially, comparator 114 receives $V_{REF}$ and as a result outputs a low signal, which after passing through the delay of delay circuit (e.g., 30 to 50 nsec) reaches the gate of PMOS transistor 112, thereby enabling that device. The enabled PMOS transistor 112 conducts VCC to node 106, thereby precharging that node. The precharged node 106 also inputs to the non-inverting input of comparator 116, thereby causing it to output a high value, which after passing through delay circuit 114 disables PMOS transistor 112, while capacitor 108 maintains the precharge voltage at node 106. Next, as input $I_{PWR}$ rises, FET 100 conducts and the current is also mirrored through FET 104, thereby creating a discharge of node 106, where the discharge rate is responsive to the RC effect from capacitor 108 and the resistance of NMOS transistor 104, to the extent that resistance is controlled by the level of $I_{PWR}$. From this discharge, eventually the voltage at node 106 falls below $V_{REF}$, in which case again the output of comparator 116 transitions to low, which after passing through the delay of delay circuit 114 again enables PMOS transistor 112, thereby repeating the process described above. Given the preceding, therefore, one skilled in the art will appreciate that the output of PCO 16*e*, $f_{PCO}$, provides a transitioning signal with a frequency that may be generally represented by the following Equation 1:

$$f_{PCO} = \frac{C(108) \times V_{REF}}{I_{PWR}} + \Delta \qquad \text{Equation 1}$$

where,

C(108) is the capacitance of capacitor 108; and $\Delta$ is the delay of a one-shot reset circuit (not separately shown) that resets the input node (capacitor) of comparator 116. Note that $\Delta$ also sets the width of output pulses of PCO 16*e*.

Figure 6:
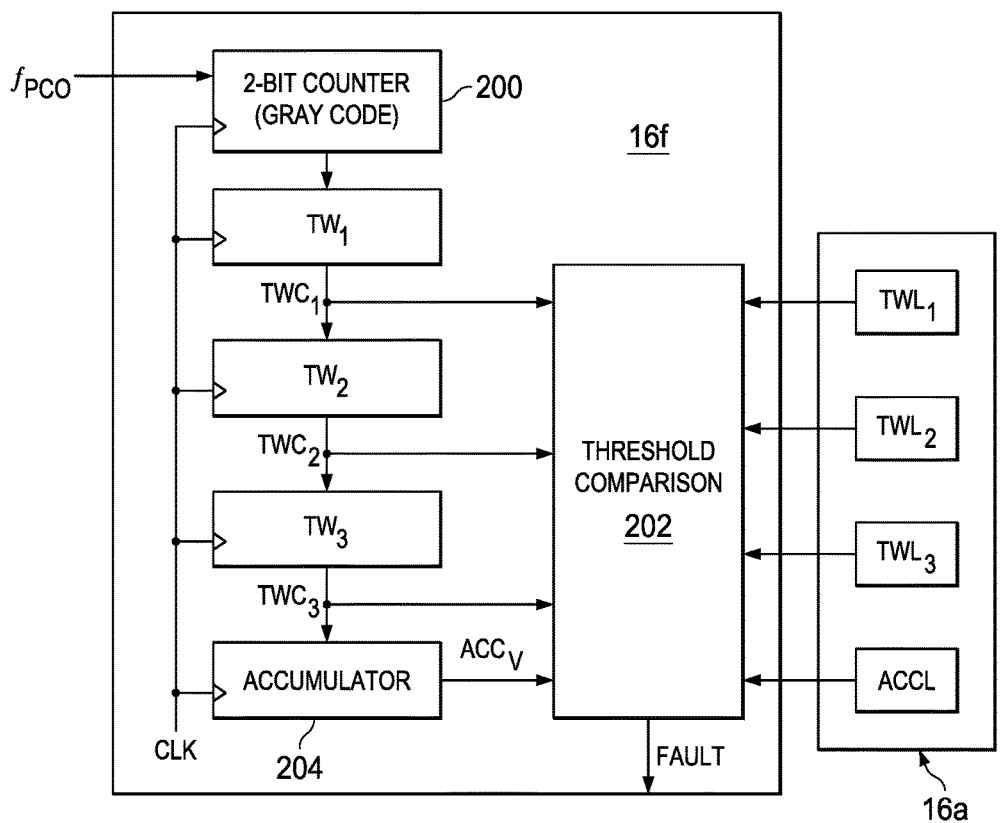
FIG. 6 illustrates an electrical block diagram with greater details shown for energy calculator and comparator 16f and SOA table 16a, as introduced in FIG. 4.

For sake of later discussion, note that during normal operation where operation of system 10 is occurring within the safe operating area (i.e., region SOR in FIG. 3), the period of $f_{PCO}$ is expected to be at least 512 μsec by way of example, and this is noted because, as further detailed below, the preferred embodiment examines $f_{PCO}$ over time and a shorter $f_{PCO}$ period may well be interpreted as a fault condition, FIG. 6 illustrates an electrical block diagram with greater details shown for energy calculator and comparator 16*f* and SOA table 16*a*. Each of the blocks in FIG. 6 is described below, where one skilled in the art may ascertain various manners of implementing those blocks (e.g., again, in circuitry, software, firmware, or a combination thereof). In a preferred embodiment, the signal $f_{PCO}$ is input to energy calculator and comparator 16*f* and more particularly to a counter 200, which in the example shown is a 2-bit counter. Counter 200 counts each period transition of the signal $f_{PCO}$, and the count is reset by the assertion of a clock CLK. For reasons evident below, CLK is asserted every 100 nsec and, therefore, counter 200 counts and then resets for each successive 100 nsec period. Note also that counter 200 may be implemented as a Gray code counter, so as to avoid Nyquist limitations that may arise if the system clock (not shown) frequency is relatively close to the event being counted (i.e., period transitions in $f_{PCO}$) and to save significant capacitor area. Note that only 2 bits are needed for a count up to four, as in the example provided normal operations should yield a count no greater than four for the period being counted; of course, in other instances, such as where larger current demands are anticipated, the number of bits in counter 200 may be increased. The count output of counter 200 is connected to a first time window block $TW_1$.

First time window block $TW_1$, from an initial reset state and as synchronized by the CLK signal for every 80 CLK periods, adds to its current count each count value received from counter 200. Thus, 100 nsec after a reset, first time window block $TW_1$ receives a first count from counter 200, and thereafter for a count instance that extends until the next reset of block $TW_1$, block $TW_1$ adds to its count total each successive count received from counter 200 during that count instance. As a result, for a number of iteratively received counts from counter 200, block $TW_1$ develops a total count corresponding to a time window for block $TW_1$. For example, this iterative operation is represented in the following Equation 2:

$$TW_1 \text{ counts} = \Sigma_{i=1}^{80}(100 \text{ nsec counts from counter } 200) \qquad \text{Equation 2}$$

Equation 2 is intended to indicate that, after a reset by asserting a clock CLK, counter 200 counts for a 100 nsec period, and that count concluding the 100 nsec period is output to first time window block $TW_1$; block $TW_1$ stores this first post-reset count as a total, and thereafter it adds to its total each additional consecutive 100 nsec count from counter 200, for a total of i=80 iterations, where the first iteration is the initial total from counter 200 followed by 79 adds thereafter. Hence, block $TW_1$ sums the counts received from counter 200 over an (i=80)*100 nsec=8 μsec time window period. Once block $TW_1$ concludes its summation over i=80 iterations, it outputs the summed number of counts $TWC_1$ to a threshold comparison block 202 and also to a second time window block $TW_2$. Thereafter, block $TW_1$ resets in synchronization with the next CLK signal, and it receives its next initial count from counter 200 and repeats the process described above, again to total a next set of i=80 counts received from counter 200.

Second time window block $TW_2$ operates in a comparable manner to first time window block $TW_1$ described above, but block $TW_2$ adds counts over a longer respective time window. For block $TW_2$, from an initial reset state and as synchronized by the CLK signal for every 1,280 CLK periods (i.e., 1,280*100 nsec=128 μsec), block $TW_2$ adds to its current count each count value received from block $TW_1$. Thus, after a block $TW_2$ reset, second time window block $TW_2$ receives a first count from block $TW_1$, and thereafter for a 128 μsec count instance that extends until its next reset, block $TW_2$ adds to its total each successive count received from block $TW_1$ during that count instance. As a result, for a number of iterations, block $TW_2$ develops a total count corresponding to a time window for block $TW_2$, and this iterative operation is represented in the following Equation 3:

$$TW_2 \text{ counts} = \Sigma_{i=1}^{16}(8 \text{ μsec counts from block } TW_1) \qquad \text{Equation 3}$$

Equation 3 is intended to indicate that, after a resetting instance from a transition of CLK, block $TW_2$ stores a first post-reset count from block $TW_1$ as a total, and thereafter for 15 more iterations block $TW_2$ adds to its total each additional consecutive 8 μsec count from block $TW_1$, for a total of i=16 iterations of count values received from block $TW_1$. Hence, block $TW_2$ sums the counts received from block $TW_1$ over a 128 μsec time window period. Once block $TW_2$ concludes its summation over i=16 iterations, it outputs the summed number of counts $TWC_2$ to threshold comparison block 202 and also to a third time window block $TW_3$. Thereafter, block $TW_2$ resets in synchronization with the next CLK signal, and it receives its next initial count from block $TW_1$ and repeats the process described above, again to total i=16 count values received from block $TW_1$.

Third time window block $TW_3$ operates in a comparable manner to first and second time window blocks $TW_1$ and $TW_2$ described above, but block $TW_3$ adds counts over still a longer time window. For block $TW_3$, from an initial reset state and as synchronized by the CLK signal for every 10,240 CLK periods (i.e., 10,240*100 nsec=1,024 μsec), block $TW_3$ adds to its current count each count value received from block $TW_2$. Thus, after a block $TW_3$ reset, third time window block $TW_3$ receives a first count from block $TW_2$, and thereafter for a 1,024 μsec count instance that extends until its next reset, block $TW_3$ adds to its total each successive count received from block $TW_2$ during that count instance. As a result, for a number of iterations, block $TW_3$ develops a total count corresponding to a time window for block $TW_3$, and this iterative operation is represented in the following Equation 4:

$$TW_3 \text{ counts} = \Sigma_{i=1}^{8}(128 \text{ μsec counts from block } TW_2) \quad \text{Equation 4}$$

Equation 4 is intended to indicate that, after a resetting instance from a transition of CLK, block $TW_3$ stores a first post-reset count from block $TW_2$ as a total, and thereafter for 7 more iterations block $TW_3$ adds to its total each additional consecutive 128 μsec count from block $TW_2$, for a total of i=8 iterations of count values received from block $TW_2$. Hence, block $TW_3$ sums the counts received from block $TW_2$ over a 1,024 μsec time window period. Once block $TW_3$ concludes its summation over i=8 iterations, it outputs the summed number of counts $TWC_3$ to threshold comparison block 202 and also to an accumulator 204. Thereafter, block $TW_3$ resets in synchronization with the next CLK signal, and it receives its next initial count from block $TW_2$ and repeats the process described above, again to total i=8 count values received from block $TW_2$.

Accumulator 204 receives count $TWC_3$ from third time window block $TW_3$ and adds that to any earlier received value from block $TWC_3$, without resetting under normal operations. Thus, over successive 1,024 μsec time windows for block $TW_3$, if block $TW_3$ outputs a non-zero count, then the value in accumulator 204 may tend to increase from successive non-zero values received from block $TW_3$. In addition, however, accumulator 204 further operates to decrement its accumulated count at a fixed frequency, which in a preferred embodiment example is a decrement of one count per 512 μsec. In this regard, recall that third time window block $TW_3$ produces a new count output for count $TWC_3$, every 1,024 μsec. In effect, therefore, accumulator 204 will decrement that count a first time, halfway along the period at which it is receiving counts from time window block $TW_3$, and it will decrement again a second time, 512 μsec after the halfway point, so as to decrement twice during each 1,024 μsec period. Further, the count value $ACC_V$ accumulated in accumulator 204 is also input to threshold comparison block 202.

Figure 7:
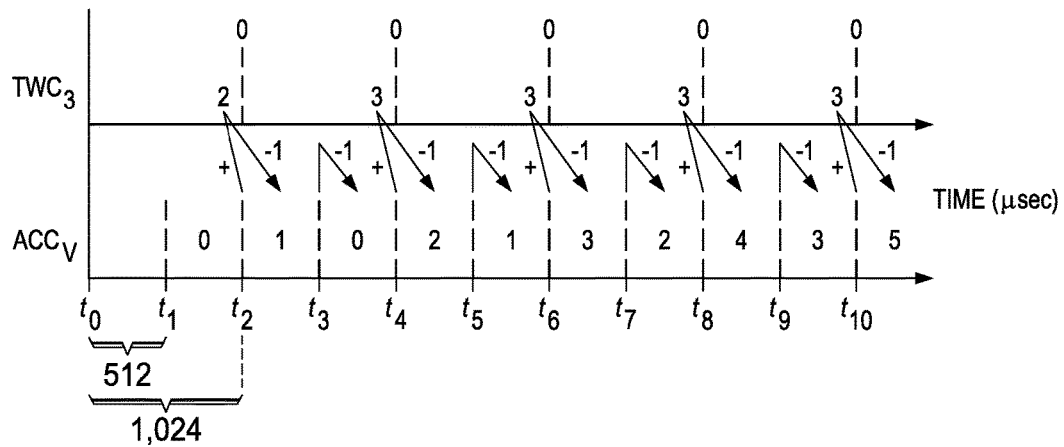
FIG. 7 illustrates a timing diagram depicting a relationship between a time window count $TWC_3$ and an accumulated value $ACC_V$ in an accumulator.

To further illustrate the operation of accumulator 204 and its relationship to the count $TWC_3$ from block $TW_3$, FIG. 7 illustrates a timing diagram with 512 μsec increments between timing events $t_0, t_1, \ldots t_{10}$. A top plot illustrates an example of a respective count $TWC_3$ for third time window block $TW_3$ as determined at each of its 1,024 μsec time windows, and a bottom plot illustrates the corresponding example of the respective accumulated value $ACC_V$ in accumulator 204. By way of example, therefore, following a reset at time $t_0$, block $TW_3$ begins to count and reaches a count of $TWC_3$=2 by the completion of its first 1,024 μsec time window, as shown at time $t_2$; meanwhile, accumulator 204 is reset to a value $ACC_V$ of 0. At time $t_2$, block $TW_3$ resets its count to a value of 0 (as shown above the vertical dashed time line at $t_2$), while at the same time accumulator 204 receives the count of $TWC_3$=2 and adds it to its current accumulated value of 0 for a total of 2+0=2, while in addition accumulator 204 decrements by one every 512 μsec, so at the same time this amount is reduced by 1, leaving a total value of $ACC_V$=2+0−1=1 counts remaining in accumulator 204 immediately following time $t_2$. Once 512 μsec again expires after time $t_2$, that is, as of time $t_3$, then accumulator 204 again decrements by 1, at which point its accumulated value $ACC_V$ is reduced to 1−1=0. Meanwhile, block $TW_3$ continues to count during its second 1,024 μsec time window between times $t_2$ and $t_4$, and in the example illustrated, again during this time window $TWC_3$ reaches a value of 3, as shown immediately before time $t_4$. At time $t_4$, block $TW_3$ again resets its count to a value of 0, while at the same time accumulator 204 receives the count of $TWC_3$=3, adds it to its current accumulated value of 0 and decrements by 1, so the total of $ACC_V$=3+0−1=2 remains in accumulator 204 immediately following time $t_4$. Continuing the illustrated example, once 512 μsec again expires after time $t_4$, that is, as of time $t_5$, then accumulator 204 again decrements by 1, at which point its accumulated value is reduced to $ACC_V$=2−1=1, and meanwhile block $TW_3$ continues to count during its third 1,024 μsec time window between times $t_4$ and $t_6$ and in the illustrated example $TWC_3$ again reaches a value of 3, as shown immediately before time $t_6$. At time $t_6$, block $TW_3$ again resets its count to a value of 0, while at the same time accumulator 204 receives the count of $TWC_3$=3, adds it to its current accumulated value of 1 and decrements by 1, so the total of $ACC_V$=3+1−1=3 remains in accumulator 204 immediately following time $t_6$.

Given the preceding, one skilled in the art should appreciate the ongoing operation of accumulator 204 and its relationship with the preceding time window blocks $TW_1$, $TW_2$, and $TW_3$. Each time window block $TW_x$ amasses a count corresponding to the number of period cycles in frequency $f_{PCO}$ during a respective time window, and ultimately accumulator 204 has a value that rises with a greater number of counts but may steadily fall by its auto-decrement for each successive 512 μsec period. If $TWC_3$ remains near or at zero, therefore, the decrementing of accumulator 204 will keep its value also near zero. However, if $TWC_3$ remains at a value of 3 (or above), note therefore that the accumulator value will steadily increase, as its decrementing twice during each 1,024 μsec time window for block $TW_3$ will be insufficient to return the accumulated value toward 0. In this regard, for example, note further the continuing example in FIG. 7 at times $t_7$ and $t_8$. Specifically, at time $t_7$, accumulator 204 decrements its value from 3 to 2, but at time $t_8$, the $TWC_3$ value of 3 is added to the accumulated value of 2 and then decremented, leaving a value of 4 in accumulator 204. A similar occurrence happens at time $t_{10}$, so note in this pattern the accumulated value will continue to climb. The preferred embodiment consequences to such a climb, as well as the remaining blocks and operation of the FIG. 6 comparator 16$f$ and SOA table 16$a$, are further discussed below.

Given the preceding, one skilled in the art may readily appreciate that each of the time window counts $TWC_1$, $TWC_2$, and $TWC_3$ represent a real-time measure proportional to load energy, that is, proportional to the amount of load current $I_L$ (see, FIG. 1) that has been sensed over a corresponding amount of time, where the time depends on the time window per each of blocks $TW_1$, $TW_2$, and $TW_3$. For example, as block $TW_1$ counts over time, it is in effect counting a signal (i.e., $f_{PCO}$) representative of load current $I_L$ flow during that time; moreover, therefore, and as known in the art, current over time represents energy. Each of the remaining time window blocks operates similarly, and the accumulator value $ACC_V$ also is such a representation, albeit one that can decrement over time periods when load current is relatively low, yet will also increase and continue to increase, without fully decrementing, if load current is relatively high. Thus, the calculating portion of block 16*f* includes numerous stages that measure energy over different respective time periods.

Given the preceding observations, and returning to FIG. 6, threshold comparison block 202 also receives time window limit values $TWL_x$ and an accumulator value ACCL from SOA table 16*a*. In a preferred embodiment, each time window limit value $TWL_x$ corresponds to a respective time window count $TWC_x$, that is: (1) time window limit value $TWL_1$ corresponds to a respective time window count $TWC_1$; (2) time window limit value $TWL_2$ corresponds to a respective time window count $TWC_2$; and (3) time window limit value $TWL_3$ corresponds to a respective time window count $TWC_3$. Lastly, accumulator value ACCL corresponds to the count value $ACC_V$ in accumulator 204. Given these corresponding values, threshold comparison block 202 operates to compare each pair of respective corresponding values and to assert the FAULT signal if any count $TW_x$ or $ACC_V$ exceeds its respective limit $TWL_x$ or ACCL. Thus, in a preferred embodiment, one skilled in the art establishes a respective number for each of the values of $TWL_x$ and ACCL that corresponds to a sufficiently large number of counted or accumulated cycles of $f_{PCO}$, which thereby also corresponds to a relatively large amount of energy, as driven by the load current $I_L$ over time. In other words, the combined blocks in FIG. 6 provide a staged threshold comparison block 202 which, in effect, permits analysis of energy evaluation for a relatively short time (i.e., $TW_1$) relative to the limit $TWL_1$, a medium amount of time (i.e., $TW_2$) relative to the limit $TWL_2$, or a relatively longer time (i.e., $TW_3$) relative to the limit $TWL_3$, along with an ongoing accumulation over all ongoing operational time, between overall circuit resets, or the like (i.e., $ACC_V$ relative to ACCL). So long as each of the evaluated values remains within its respective limit, then FAULT is not asserted and power transistor 14 remains enabled, thereby sourcing load current $I_L$ to load 18. If, however, any of the evaluated values exceeds its respective limit, then FAULT is asserted and, as described earlier, control block 18 receives the FAULT as an ALERT and operates via its GATE output to disable the conductivity of power transistor 14, thereby potentially protecting the load 20 or the power transistor 14 from excessive energy events that otherwise could unduly stress or damage those devices. Moreover, in a preferred embodiment, once the FAULT signal is asserted, it continues to be asserted until all values $TWC_1$ through $TWC_3$ and $ACC_V$ return to zero. Thereafter, FAULT is de-asserted, at which time control block 18 may retry, that is, re-enable the GATE signal to power transistor 14. Below, such operation and resulting benefits are further illustrated, by ways of example.

As a numerical example, assume that under a given state of operation, for transistor 14, $I_{DS}$=108a and $V_{DS}$=48V, so that power=108×48≈5.2 kW. Assume also that through converters 16*b* and 16*c*, these $I_{DS}$ and $V_{DS}$ values convert, respectively, to $I_{IDS}$=4 μA and $I_{VDS}$=4 μA. Moreover, assume that the product of these powers, as input to PCO 16*e* via $I_{PWR}$, results in $f_{PCO}$=1.75 MHz. Each PCO cycle, therefore, represents 5.2 kW/1.75 MHz=3 mJ energy. Thus, in order to fault detect beyond a limit of 100 mJ for a 128 μsec period, then $TWL_2$ is set to 100 mJ/3 mJ≈33 counts. In other words, since time window block $TW_2$ accrues counts over a 128 μsec period, then so long as those counts are 33 or below, then 100 mJ of energy has not been measured during that period; if, however, the count $TWC_3$ exceeds 33, then energy has exceeded 100 mJ, and the FAULT is asserted as described above. Of course, the above numbers are only by way of example, and one skilled in the art may appreciate numerous other examples and conditions, as well as comparable applicability to other time windows and to accumulator 204

Figure 8:
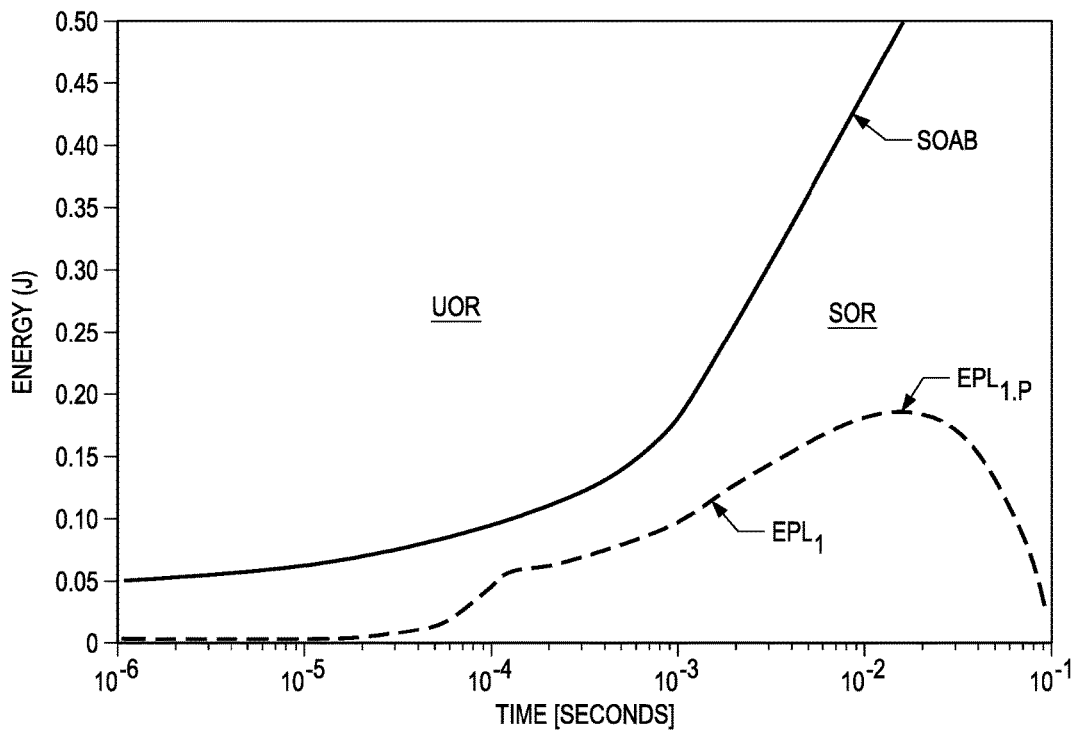
FIG. 8 repeats the illustration of FIG. 3, but adds an energy plot line $EPL_1$ to demonstrate a first example of the SOA location of an energy profile of load current $I_L$ through a load.

FIG. 8 repeats the illustration of FIG. 3, but adds an energy plot line $EPL_1$ (shown as a dashed line) to demonstrate an example of the energy profile of load current $I_L$ through load 20. Note that plot line $EPL_1$ has a peak $EPL_{1,P}$ that may occur at power-up, when driving an incandescent bulb as the load at low temperature (e.g., −40° C.), and indeed note further that the energy profile rolls off after peak $EPL_{1,P}$, thereby representing that after a certain time driving a bulb, the continuing drive energy expended is less than the package/assembly is able to dissipate, so the dissipation thereby reduces the accumulated energy on the device going down to zero for long term operation. Looking before the roll-off at peak $EPL_{1,P}$, it may occur when current $I_L$ experiences what is considered an in-rush level for a relatively short period of time, during which the real-time current magnitude may exceed the manufacturer specification or datasheet current. Indeed, in a prior art implementation, an in-rush event may cause a power controller to turn off the power transistor through which the current is provided, as instantaneous current at that time and given circuit temperature, may be too excessive (see, e.g., FIG. 2). In the preferred embodiment, however, because the energy of the current over time is evaluated and used as a condition to control the transistor, then even at peak $EPL_{1,P}$ the amount of energy is still within the safe operating region SOR (i.e., below SOAB) and, therefore, the transistor remains on and current is continuously provided to load 20 (e.g., bulb). In other words, in terms of FIG. 6, even with instantaneous high current levels, the time-related counts within blocks $TW_1$ through $TW_2$ and accumulator 204 remain below their respective limits $TWL_1$ through $TWL_3$ and ACCL. Thus, the preferred embodiment is operable to maintain current $I_L$ in conditions where the prior art would disable it. Moreover, one skilled in the art also should now further appreciate the effect of the counts and decrementing in accumulator 204. Specifically, once a limit is exceeded, FAULT is asserted, and transistor 14 is gated off, accumulator 204 may still contain counts and they will only diminish as additional time passes, so that each count is decremented at a rate of one count/512 μsec, while FAULT will therefore remain asserted. Thus, until accumulator 204 fully decrements to zero, FAULT remains asserted and, hence, current IL is not allowed to flow as power transistor 14 remains disabled. During this time, therefore, a retry does not occur and energy may dissipate at a controlled rate, such as that equivalent to the rate of thermal dissipation associated with either the integrated circuit package or printed circuit board (PCB) associated with either load 20 or the entirety of system 10. Thus, when a retry does occur, after $ACC_V$ reaches zero, adequate thermal energy is also dissipated so as not to overly stress the power transistor on the next attempted retry.

Having demonstrated various results in FIG. 8, then returning to FIG. 6 one skilled in the art can now appreciate that each of the energy limits of the values $TWL_x$ and accumulator value ACCL may be set with numbers that may be derived from the SOA boundary SOAB, according to the safe operating energy limit shown by that boundary over different amounts of time. With such limits, FIG. 8 illustrates an example where system 10 is operating within the safe operating area, and note therefore that energy plot line $EPL_1$ always remains in safe operating region SOR. To maintain such operation, therefore, as each time window block periodically assesses energy through power transistor 14, threshold comparison block 202 respectively confirms that no respective energy limit (from SOA table 16a) is exceeded and, hence, control block 18 continues to enable power transistor 14. To the contrary, if any of the limits is exceeded, then $I_L$ is disrupted so as to not unduly stress or potentially damage system components and adequate time is allotted before retry or re-enablement $I_L$, so as to adequately dissipate energy again to protect the system.

FIG. 9 repeats the illustration of FIG. 3, but has a second alternative energy plot line $EPL_2$ to demonstrate an alternative example of an energy profile of load current $I_L$ through load 20. The FIG. 9, example, however, demonstrates an instance, such as a short-circuit, where a measure of current $I_L$ increases rapidly around a time indicated at $t_1$, that is, as shown where energy plot line $EPL_2$ begins to rise in a near-vertical fashion. According to one preferred embodiment, recall that control block 18 of FIG. 1 may receive alternative fault conditions, including from a current detection circuit that monitors a measure of the current $I_L$, and that also alerts block 18 if the sensed current exceeds a given limit. In FIG. 9, therefore, such an instance occurs at time $t_1$, whereby current begins to rise very quickly and, hence, so does energy as shown in plot $EPL_2$. However, prior to the energy reaching the SOAB boundary, control block 18 may alternatively respond to the detected condition (i.e., alternative FAULT) from the current detection circuit and, in response, control block 18 disables its GATE output, thereby disabling the gate potential to, and the operation of, transistor 14. Thus, immediately following time $t_1$, FIG. 9 illustrates that energy across transistor 14 begins to decline until a time $t_2$, which is approximately 30 msec following time $t_1$.

Further according to the preferred embodiment, control block 18 does not re-enable its GATE signal solely in response to the current fault being cleared, but instead it continues to maintain its GATE output disabled until the energy, as monitored by energy SOA detection circuit 16, falls below a threshold, which threshold could be even down to a level of zero. In contrast, in the prior art where only current may be monitored in a context such as the one presently described, then a prior art control circuit may tend to re-enable (i.e., retry) the transistor gate very quickly, such as based solely on a measure of time, after the transistor was disabled; in such a prior art approach, therefore, current is repeatedly turned on and turned back off, if the short circuit condition persists. As a result, if the prior art retry time period is relatively short, additional energy accumulates across the transistor for each of the successive turn on/off periods, that is, without ample time in each instance for such energy to dissipate, it accumulates and thereby poses or causes damage to the transistor. In contrast, in a preferred embodiment and as shown in FIG. 9, even if the current condition is cured, or if the current detection circuit automatically releases its fault based on a short time period after the excessive current condition was detected, control block 18 adds the additional protective step of awaiting dissipation of energy, as occurs at time $t_2$. At that time, therefore, control block 18 re-enables GATE and transistor 14. In the example illustrated, however, the short-circuit condition persists, so at time $t_2$, again the energy plot rises very quickly as shown by the vertical transition at that time, and in response the same response occurs as did at time $t_1$, namely, control block 18 is so notified as an alternative fault condition and transistor 14 is disabled. Again, following time $t_2$, the retry is delayed until energy, as shown in plot $EPL_2$, dissipates all the way to zero, so another 30 msec passes between the successive retries. In this manner, and for any additional successive retries, in each instance the amount of energy imposed across transistor 14 is limited to below the boundary SOAB. As a result, even in the instance of multiple successive retries, transistor 14 is protected, as compared to a current-only detection approach of the prior art.

Given the preceding, the preferred embodiments provide a beneficial and improved electronic power driven systems, such as those driven with power FETs. The preferred embodiments permit the power driving of a load under potentially high current situations, either anticipated (e.g., cold start-up) or undesirable (e.g., short circuit), where protection is afforded of the power system while also permitting flexibility to safely turn on a load if energy constraints associated with the system are not exceeded. Numerous other benefits arise from the preferred embodiments, and still others may be ascertained by one skilled in the art. As further examples, therefore, in one implementation, load protection may be implemented without restrictions based on, or solely on, instantaneous current or power or, as alternative so as not to stop current simply in response to a real-time transient. Thus, the preferred embodiments permit peak power transients without causing SOA boundary violation in terms of energy. As another example, while one preferred embodiment implementation has been described in connection with an incandescent bulb in an automotive application as the load, various other implementations will benefit. As another example, reliability is improved by disabling the power transistor until energy is fully dissipated, and retry time depends on the energy generated on the transistor, as will be tracked in the accumulator. As another example, SOA boundary is dynamically monitored by different temporal windows and energy limit thresholds, so as to evaluate multiple energy limits corresponding to different time periods. As still another example, the preferred embodiment may be implemented with non-complex circuitry (e.g., PCO circuitry combined with a Gray-coded counter) allowing a power-to-digital conversion. In view of the above, therefore, the inventive scope is far reaching, and while various alternatives have been provided according to the disclosed embodiments, still others are contemplated and yet others can ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A circuit protective system, comprising:
    a reference current sensing input;
    a reference voltage sensing input;
    energy circuitry having inputs coupled to the current sensing input and the voltage sensing input and having an energy output;
    threshold circuitry having an input coupled to the energy output and having a fault output; and
    in which the energy circuitry includes oscillator circuitry coupled to the current sensing input and the voltage sensing input for producing a signal at the energy output having a frequency, and the frequency is responsive to a reference current and a reference voltage.

2. The system of claim 1 in which the energy circuitry includes a counter for counting cycles of the signal over a first period of time.

3. The system of claim 2 in which the energy circuitry includes at least one time window circuit for summing successive counts from the counter over a second period of time greater than the first period of time.

4. The system of claim 3 in which the threshold circuitry provides a fault signal on the fault output in response to the at least one time window circuit summing successive counts to exceed a threshold.

5. The system of claim 2:
   in which the energy circuitry includes time window circuits, in which each time window circuit is for summing successive counts from the counter over a respective different period of time; and
   in which the threshold circuitry generates a threshold signal on the threshold output in response to any one of the time window circuits summing successive counts to exceed a threshold corresponding to the one of the of the time window circuits.

6. The system of claim 5:
   in which the counter is for counting during an iteration and then resetting to count for each successive next iteration; and
   in which the time window circuits include:
   a first time window circuit coupled to receive a count from the counter over a first number of counter iterations;
   a second time window circuit coupled to receive a count from the first time window circuit over a second number of counter iterations greater than the first number of counter iterations; and
   a third time window circuit coupled to receive a count from the second time window circuit over a third number of counter iterations greater than the first number of counter iterations.

7. The system of claim 6 and further including:
   an accumulator for receiving and summing successive counts from the third time window circuit; and
   circuitry for periodically decrementing the accumulator.

8. The system of claim 7 in which the threshold circuitry generates the fault signal in response to a sum in the accumulator exceeding the threshold.

9. The system of claim 8 including comparator circuitry for disabling flow of the reference current in response to the fault signal when the energy exceeds the threshold.

10. The system of claim 9 in which the threshold includes a first threshold, and including comparator circuitry for re-enabling flow of the reference current, after disabling flow of the reference current, in response to the fault signal and when the estimated energy falls below a second threshold.

11. The system of claim 8 including comparator circuitry for disabling flow of the reference current in response to the fault signal when the energy exceeds the threshold and for a duration until the accumulator is decremented to a count of zero.

12. The system of claim 2 in which the counter includes a Gray code counter.

13. The system of claim 1 including comparator circuitry for disabling flow of the reference current in response to the fault signal when the energy exceeds the threshold.

14. The system of claim 1 including a transistor having a gate coupled to be selectively enabled and disabled in response to the fault signal and for conducting the reference current when enabled.

15. The system of claim 14 including a load coupled to the transistor and for receiving a current when the transistor is enabled.

16. The system of claim 15 in which the load includes an incandescent bulb.

17. A circuit protective system, comprising:
   a first terminal to connect to a first node;
   a second terminal to connect to a second node;
   current determining circuitry determining a reference current between the first node and the second node;
   a third terminal to connect to a third node;
   voltage determining circuitry determining a reference voltage between the third node and another node;
   energy determining circuitry estimating energy in response to the reference current and the reference voltage;
   control signal circuitry generating a control signal responsive to the estimated energy exceeding a threshold; and
   in which the energy determining circuitry includes waveform circuitry producing a signal having a frequency, in which the frequency is responsive to a product of the reference current and the reference voltage.

* * * * *